(12) United States Patent
Kuntzevitsky

(10) Patent No.: US 12,194,400 B2
(45) Date of Patent: Jan. 14, 2025

(54) PROCESSING OF RED MUD IN BAUXITE REFINING

(71) Applicant: Enervoxa Inc., Bolton (CA)

(72) Inventor: Igor Kuntzevitsky, Bolton (CA)

(73) Assignee: ENERVOXA INC., Bolton (CA)

(*) Notice: Subject to any disclaimer, the term of this patent is extended or adjusted under 35 U.S.C. 154(b) by 756 days.

(21) Appl. No.: 17/403,003

(22) Filed: Aug. 16, 2021

(65) Prior Publication Data

US 2022/0184536 A1 Jun. 16, 2022

Related U.S. Application Data (60) Provisional application No. 63/125,470, filed on Dec. 15, 2020.

(51) Int. Cl.

| | |
|---|---|
| B01J 37/03 | (2006.01) |
| B01D 21/00 | (2006.01) |
| B01D 21/01 | (2006.01) |
| B01D 21/26 | (2006.01) |
| B01D 25/12 | (2006.01) |
| B01D 37/03 | (2006.01) |
| C01G 49/00 | (2006.01) |
| C02F 1/00 | (2023.01) |
| C02F 11/125 | (2019.01) |
| C02F 11/127 | (2019.01) |
| C02F 103/10 | (2006.01) |

(52) U.S. Cl.
CPC ......... B01D 37/03 (2013.01); B01D 21/0012 (2013.01); B01D 21/0045 (2013.01); B01D 21/01 (2013.01); B01D 21/262 (2013.01); B01D 25/12 (2013.01); C02F 1/00 (2013.01); C02F 11/125 (2013.01); C02F 11/127 (2013.01); C02F 2103/10 (2013.01)

(58) Field of Classification Search
None
See application file for complete search history.

(56) References Cited

U.S. PATENT DOCUMENTS 6,248,302 B1  6/2001  Barnett et al.

FOREIGN PATENT DOCUMENTS

| CN | 101440324 A | 5/2009 |
|---|---|---|
| CN | 101456573 B | 4/2011 |
| CN | 102092910 A | 6/2011 |

(Continued)

*Primary Examiner* — Yun Qian
(74) *Attorney, Agent, or Firm* — Wyatt, Tarrant Combs, LLP; Stephen C. Hall (57) ABSTRACT

A method of processing pulp, extracted from red mud in processing bauxite, includes the following steps. The pulp is filtered to obtain a first filter cake and a first filtrate. Aluminum is leached from the first filter cake by adding, to the first filter cake, sodium hydroxide (NaOH) solution to form an aluminum-containing first slurry. The first slurry is filtered to obtain an aluminum-containing second filter cake and a second filtrate. From the second filtrate, in presence of carbon dioxide gas, first aluminum compounds are filtered out. Aluminum is leached out from the second filter cake by adding, to the second filter cake, NaOH solution to form a second slurry. The second slurry is filtered to obtain a third filter cake and an aluminum-containing third filtrate. From the third filtrate, second aluminum compounds are precipitated out which include sodium hydroaluminocarbonate and aluminum hydroxide.

18 Claims, 6 Drawing Sheets

(56) References Cited

FOREIGN PATENT DOCUMENTS

| | | |
|---|---|---|
| CN | 102500596 B | 8/2013 |
| CN | 102757078 B | 3/2014 |
| CN | 101472836 B | 9/2014 |
| CN | 104120268 A | 10/2014 |
| CN | 103290207 B | 8/2015 |
| CN | 204550087 U | 8/2015 |
| CN | 105417559 A | 3/2016 |
| CN | 100370040 C | 2/2020 |
| CN | 110331289 B | 1/2021 |
| CN | 112279284 A | 1/2021 |
| WO | 2010079369 A1 | 7/2010 |

PROCESSING OF RED MUD IN BAUXITE REFINING

CROSS-REFERENCE TO RELATED APPLICATION

This application claims the benefit of U.S. Provisional Application No. 63/125,470 filed on Dec. 15, 2020, which is incorporated in its entirety herein by reference herein.

FIELD OF THE DISCLOSURE

The present invention relates to a system and method for processing pulp. The pulp comprises a mixture of ground ore and water that is extracted from the red mud obtained the process of refining bauxite.

BACKGROUND OF THE INVENTION

Red mud is a large-tonnage waste of bauxite processing by the Bayer process. For 1 ton of alumina obtained from bauxite, 1.2-1.5 tons of red mud are formed. Red mud contains underexposed amounts of aluminum, significant amounts of iron, compounds of rare metals—titanium, zirconium, scandium, strontium, niobium, hafnium, rare earth elements (REE), compounds of silicon, manganese, calcium, magnesium, nickel, zinc, barium, residual free alkali and a number of other components. In the absence of complex processing, the red mud is still discharged into red mud's ponds, occupying large areas of land and creating significant problems in protecting the environment from pollution by toxic components of sludge.

At the same time, by the volume of accumulated red mud and by the content of some valuable components in them, for example, rare earth elements up to 4000 ppm, zirconium up to 2500 ppm, scandium 90 to 140 ppm, they can be considered as technogenic deposits of rare and trace elements. In this regard, the complex processing of red mud with the extraction of all valuable components from them and their transformation into marketable products consumed in various industries and technology, and which simultaneously allows solving environmental problems, is a needful and actual task facing the technological community. Two factors determine the relevance of works aimed at the complex processing of red mud. The first factor is associated with the economic efficiency and completeness of extraction of the most valuable micro-components of red mud, mainly compounds of rare metals, and the transfer of macro-components, such as aluminum, iron, silicon, calcium, magnesium, into marketable products. The second factor is associated with a reduction in the discharge of red mud into the environment, the removal of historically accumulated reserves from it, and the solution of environmental problems associated with the placement of red mud in sludge ponds.

Thus, the complexity of the processing of red mud with the transformation of all its components into marketable consumable products and the removal of red mud from the environment are urgent tasks.

SUMMARY

This relates to processing pulp. The pulp might include a mixture of ground ore and water that is extracted from the red mud obtained in processing bauxite.

An example method of processing the pulp might include steps of (i) filtering the pulp to obtain a first filter cake and a first filtrate; (ii) leaching aluminum from the first filter cake by adding, to the first filter cake, sodium hydroxide (NaOH) solution to form an aluminum-containing first slurry; (iii) filtering the first slurry to obtain an aluminum-containing second filter cake and a second filtrate; (iv) precipitating, from the second filtrate in the presence of carbon dioxide ($CO_2$) gas, first aluminum compounds that include sodium hydroaluminocarbonate (e.g., $CH_4AlNaO_5$) and aluminum hydroxide (e.g., $Al(OH)_3$); (v) leaching aluminum from the second filter cake, by adding, to the second filter cake, NaOH solution, to form a second slurry; (vi) filtering the second slurry to obtain a third filter cake and an aluminum-containing third filtrate; (vii) precipitating, from the third filtrate, second aluminum compounds comprising sodium hydroaluminocarbonate and aluminum hydroxide; (viii) combining a solution of sodium carbonate ($Na_2CO_3$) and carbon dioxide ($CO_2$) to obtain a solution of $Na_2CO_3$ and sodium bicarbonate ($NaHCO_3$); (ix) leaching titanium (Ti), zirconium (Zr) and scandium (Sc) from the third filter cake by adding the solution of $Na_2CO_3$ and $NaHCO_3$ to the third filter cake to form a third slurry; (x) filtering the third slurry to obtain both a fourth filter cake and a fourth filtrate that includes Ti, Zr and Sc; (xi) precipitating out titanium oxide ($TiO_2$) from a mixture of the fourth filtrate and NaOH solution, leaving behind a first supernate solution that includes Zr and Sc; (xii) heating a mixture that includes the first supernate solution and NaOH and an aluminum-based coagulant, to yield a precipitate that includes Zr and Sc; (xiii) leaching Zr and Sc from the fourth filter cake, by adding the solution of $Na_2CO_3$ and $NaHCO_3$ to the fourth filter cake to form a fourth slurry; (xiv) filtering the fourth slurry to obtain an iron-containing fifth filter cake and a fifth filtrate; (xv) precipitating out $TiO_2$ from a mixture of the fifth filtrate and a NaOH solution, leaving behind a second supernate solution that includes Zr and Sc; and (xvi) heating a mixture that includes the second supernate solution and NaOH and an aluminum-based coagulant, to yield a precipitate that includes Zr and Sc.

The example method might further include steps of (xvii) obtaining the solution of NaOH used in (i), (xii) and (xvi) by recovering NaOH solution from (xii) and (xvi), and heating the recovered NaOH. The water for solution preparation of the coagulant used in (xii) and (xvi) might be activated by cold plasma. The method might further include, prior to (i), extracting the pulp from the red mud by a dredger, and averaging the pulp in a container with a mechanical stirrer.

The example method might further include, after (i), returning the first filtrate to the red mud. The first slurry that is filtered in (iii) might be sent for filtration in a centrifuge or a screw filter press in a flow-through mode. The second filtrate obtained in (iii) might be sent to sedimentation in a lamellar clarifier.

In (ix), the solution of $Na_2CO_3$ and $NaHCO_3$ might have a concentration of about 2M with a temperature of about 70 C in a liquid-solid ratio of about 5:1 in a flow-through mode for leaching Ti, Zr, and Sc. The precipitates yielded by (xii) and (xvi) might include other rare earth elements (REEs) in addition to Sc. In (x), the third slurry might be sent for filtration in a centrifuge or a screw filter press in a flow-through mode. In (xi), the precipitation might be carried out at a temperature of about 75 C, and might include addition of a coagulant with ultrasound.

In (xii), the mixture might be heated to about 100 C, the NaOH might have a concentration of about 4M and a pH of about 14, and a ratio of the coagulant to Zr might be about 10:1. In (xiv), the filtering might be performed by a centrifuge or a screw filter press in a flow-through mode. In (xv), the precipitation might be carried out at a temperature of about 75 C, and might include addition of a coagulant with ultrasound.

In (xvi), the mixture might be heated to about 100 C, the NaOH might have a concentration of about 4M and a pH of about 14, and a ratio of the coagulant to Zr might be about 10:1.

An additional step (xviii) might include neutralizing the iron containing fifth filter cake from (xv) to a pH of about 7 9. In (xii) and (xvi), the coagulant might include water that is activated by cold plasma. The CO2 used in (iv) and (viii) might be supplied from exhaust of an operating plant that performs said method of processing pulp.

BRIEF DESCRIPTION OF THE DRAWINGS

FIGS. 1A and 1B together comprise an expanded reproduction of FIG. 1. FIGS. 1A and 1B are configured to be linked together, edge to edge, by overlapping parting line P in FIG. 1A with parting line P in FIG. 1B.

FIG. 2 is similar to FIG. 1, but uses somewhat different terminology than in FIG. 1.

FIGS. 2A and 2B together comprise an expanded reproduction of FIG. 2. FIGS. 2A and 2B are configured to be linked together, edge to edge, by overlapping parting line P in FIG. 2A with parting line P in FIG. 2B.

The figures are intended to be illustrative, not limiting. Certain elements in some of the figures may be omitted, or illustrated not-to-scale, for illustrative clarity. In the drawings accompanying the description that follows, both reference numerals and legends (labels, text descriptions) may be used to identify elements. If legends are provided, they are intended merely as an aid to the reader, and should not in any way be interpreted as limiting.

DETAILED DESCRIPTION OF THE PREFERRED EMBODIMENTS

In the description that follows, numerous details are set forth in order to provide a thorough understanding of the present invention. It will be appreciated by those skilled in the art that variations of these specific details are possible while still achieving the results of the present invention. Well-known processing steps are generally not described in detail in order to avoid unnecessarily obfuscating the description of the present invention.

In the drawings accompanying the description that follows, often both reference numerals and legends (labels, text descriptions) will be used to identify elements. If legends are provided, they are intended merely as an aid to the reader, and should not in any way be interpreted as limiting.

Each block shown in the figures can be characterized as portraying a respective "method step". But each block, can be also characterized as portraying a physical "processing station" in which a respective chemical mixture is contained and/or processed.

Figure 1:
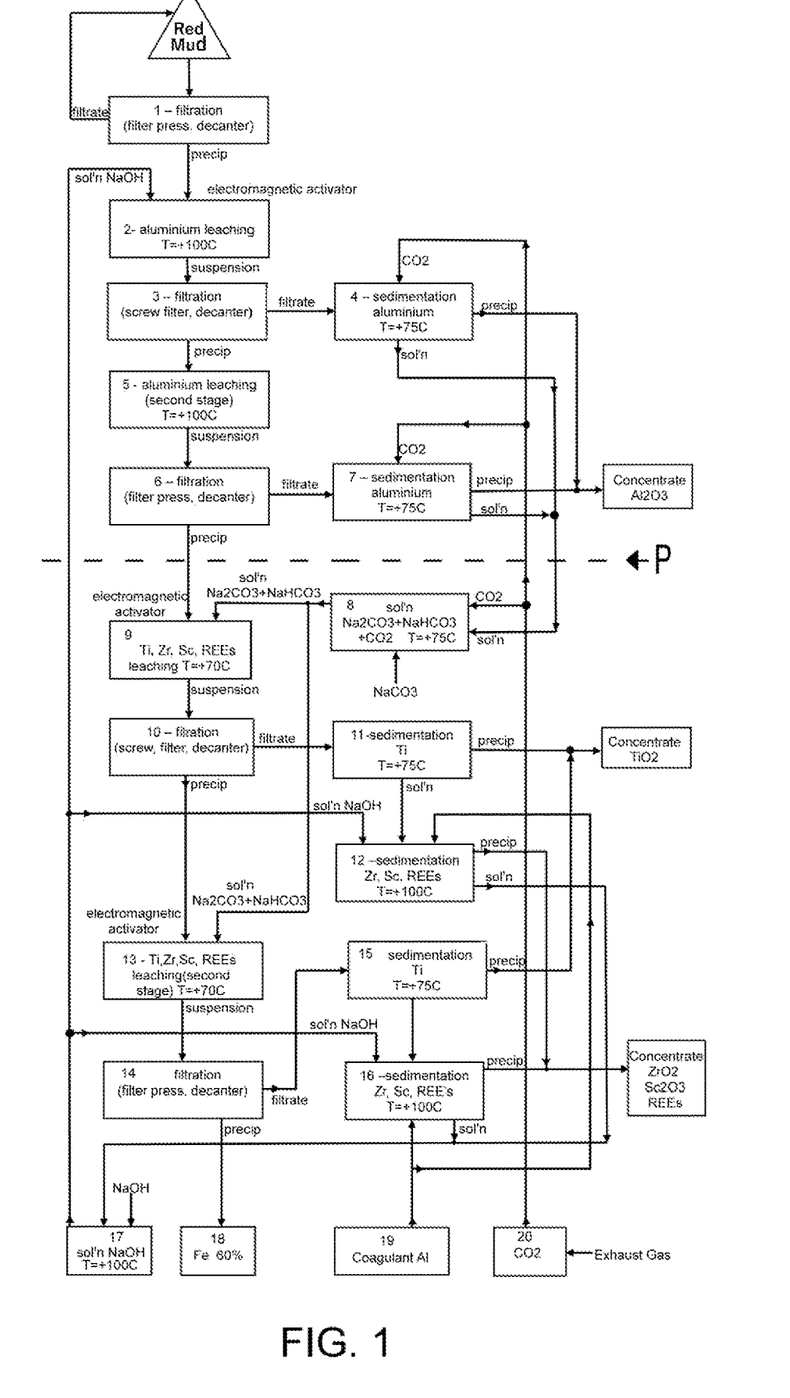
FIG. 1 is a flowchart of an example method for processing pulp, in which the pulp can be a mixture of water and ground ore extracted from red mud obtained in processing bauxite.
Figure 1A:
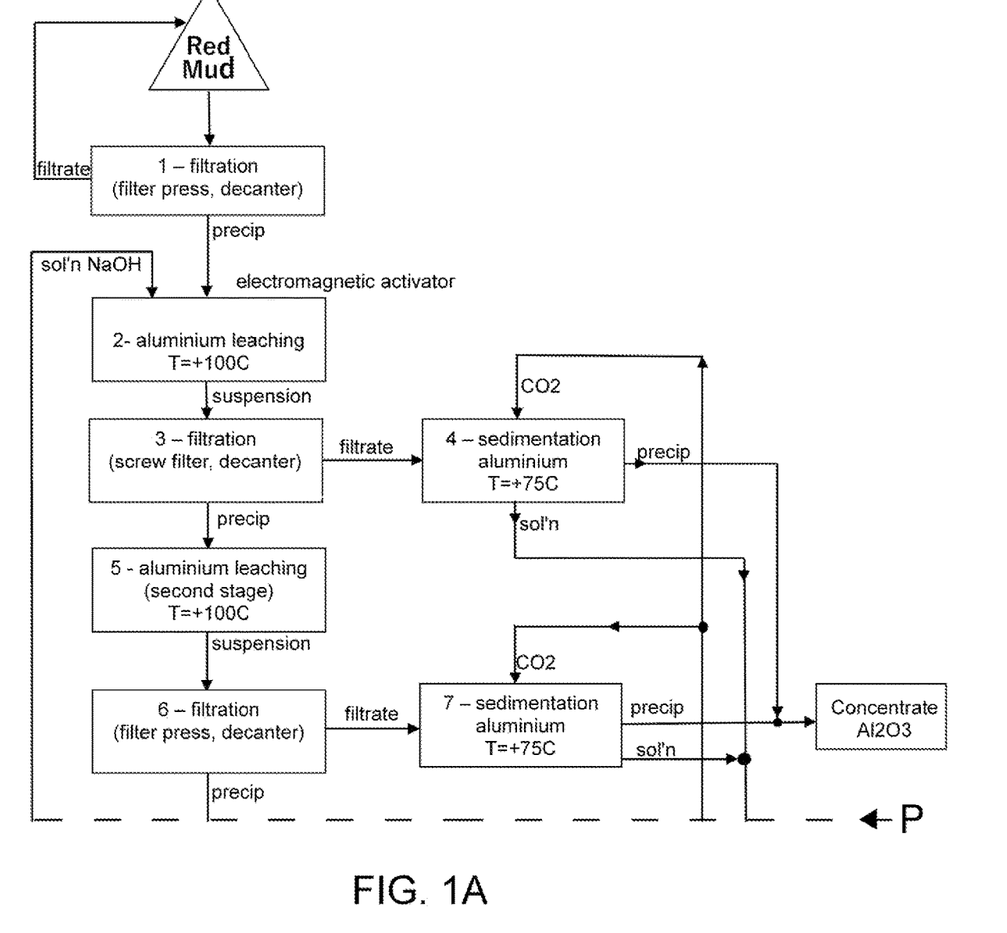
FIG. 1A is a reproduction of a top half (above dashed parting line P) of FIG. 1.
Figure 1B:
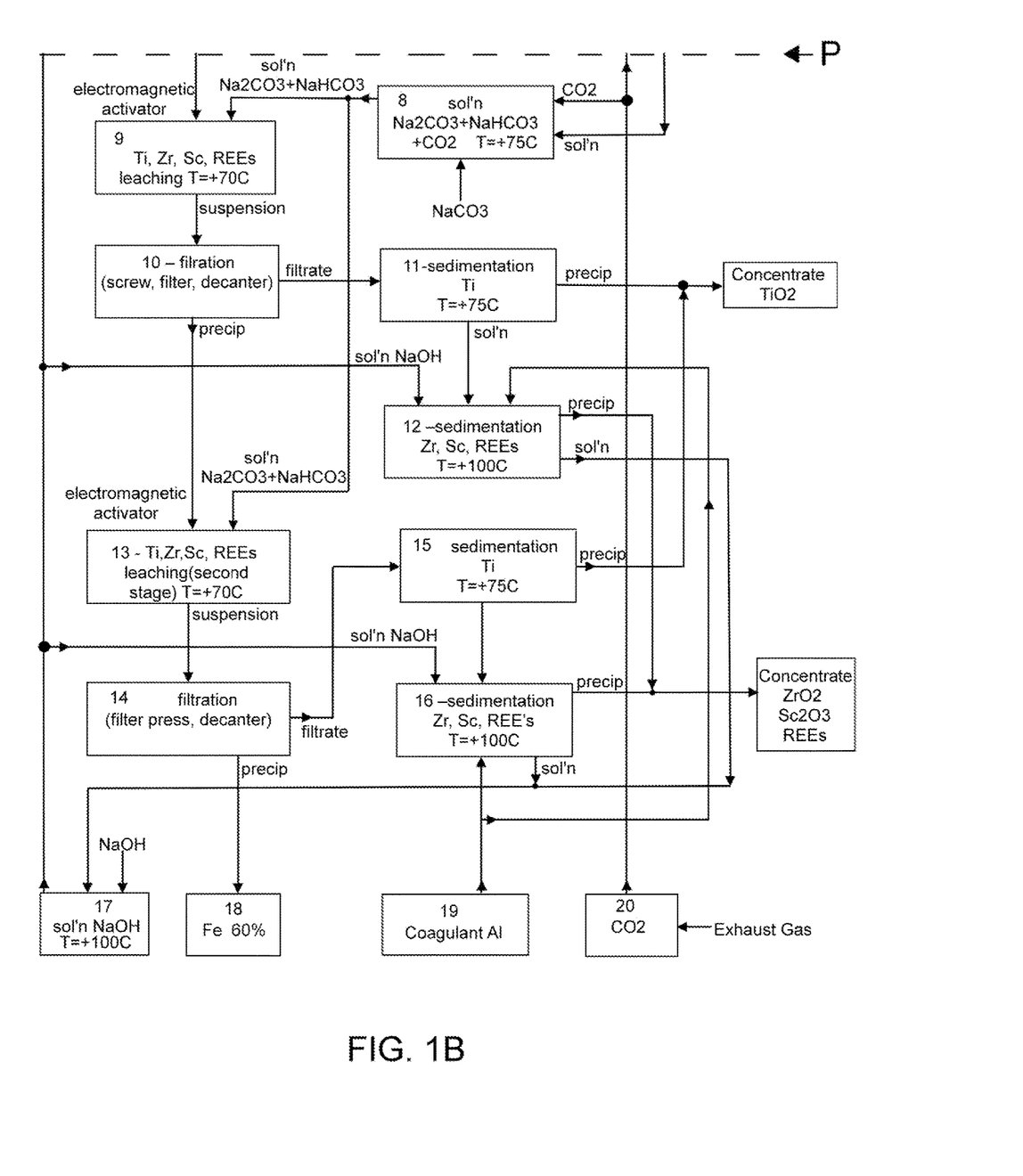
FIG. 1B is a reproduction of a bottom half (below dashed parting line P) of FIG. 1.

FIG. 1 is a flowchart of an example method for processing pulp. The pulp might be a mixture of water and ground ore extracted from red mud obtained in processing bauxite. FIGS. 1A and 1B together comprise an expanded reproduction of FIG. 1. FIG. 1A is a reproduction of a top half of FIG. 1, and FIG. 1B is a reproduction of a bottom half of FIG. 1. FIGS. 1A and 1B are configured to be linked together, edge to edge, by overlapping dashed parting line P in FIG. 1A with dashed parting line P in FIG. 1B.

Step 1 is directed to the filtration of the pulp from red mud obtained as a result of processing bauxite and discharged into a mud collector (wet storage method). The wet storage method is carried out with the extraction of the pulp by a dredger, averaging the pulp in a container with a mechanical stirrer and filtering the pulp in a filter press or centrifuge. The ratio of liquid to solid is 5:1. The filtrate is sent back to the mud collector, and the cake (mud) is directed for complex processing into the technological process.

Step 2 is directed to the leaching of aluminum from the cake. The dewatered mud is fed by a screw feeder to an electric pulse reactor activator simultaneously with a solution of the reagent NaOH with a concentration of about 4M heated to a temperature of about +80 C in a liquid-solid ratio of about 5:1 in a flow-through mode. In the activator reactor, the ingredients are mixed, disintegrated, and activated. After the activator reactor, the slurry is heated in a heat exchanger to about +100 C. Leaching is carried out in a container with a mechanical stirrer and a jacket heated by steam at a temperature of about +100 C for about 30 minutes.

Step 3 occurs after the first stage of aluminum leaching. In step 3, the slurry is sent for filtration in a centrifuge or screw filter press in a flow-through mode. The filtrate is sent to sedimentation in a lamellar clarifier, and the cake (sediment) to the second stage of aluminum leaching.

In step 4, in a lamellar settler (precipitator) at a temperature of about +75 C and saturation of the suspension with $CO_2$ gas, conditions are created for the precipitation of aluminum compounds in the form of sodium hydroaluminocarbonate $NaAlCO_3(OH)_2$ and aluminum hydroxide $Al(OH)_3$. The step 4 process takes place in a flowing mode and a time of about 30 minutes. The clarified solution of sodium bicarbonate ($NaHCO_3$) is sent for additional strengthening to station 9 and then for leaching of titanium, zirconium, scandium and rare earth elements (REEs) to station 8. The precipitate of aluminum compounds is sent for processing into marketable products (coagulants, catalysts, powders, etc.).

In step 5, cake (sediment) remaining after filtering the pulp of the first stage of aluminum leaching is sent to the second stage of aluminum leaching, where the leaching process is performed at the same technological parameters as in the first stage.

In step 6, after the second stage of aluminum leaching, the slurry is sent for filtration in a centrifuge or screw filter press in a flow-through mode. The filtrate is sent to sedimentation in a lamellar settler, and the cake (sediment) is sent to leaching of titanium, zirconium, scandium and rare earth elements to station 8.

In step 7, a similar process occurs in a lamellar settler (precipitator), as occurs in step 4.

In step 8, the dewatered sludge after leaching aluminum with a screw feeder is fed into the electric pulse reactor activator simultaneously with a solution of a mixture of reagents $Na_2CO_3$ and $NaHCO_3$ with a concentration of about 2M with a temperature of about +70 C in a liquid-solid ratio of about 5:1 in a flow-through mode—for leaching titanium, zirconium, scandium and rare earth elements. In the reactor, the activator is mixing, disintegration and activation of the ingredients. Leaching is carried out in a container with a mechanical stirrer and a jacket heated by steam at a temperature of about +70 C for about 30 minutes.

In step 9, a container for preparation and recovery (regeneration) of a mixture of reagents Na2CO3 and NaHCO3 with a concentration of 2M is heated with steam. Water for solution preparation is activated by cold plasma, which significantly increases reactivity and shortens the time of chemical reactions. The installation includes: a reagent dispenser Na2CO3 for strengthening the solution, a CO2 saturator for obtaining sodium bicarbonate ions NaHCO3 in a solution. The temperature in the tank is maintained at about +70 C.

In step 10, after the first stage of leaching of titanium, zirconium, scandium and rare earth elements, the pulp is sent for filtration in a centrifuge or screw filter press in a flow-through mode. The filtrate is sent to sedimentation in a lamellar clarifier, and the cake (sediment) to the second stage of leaching at station 13.

In step 11, the precipitation of titanium, zirconium, scandium and rare earth elements occurs in two stages in lamellar settling tanks (precipitators). The first stage is carried out at a temperature of about +75 C, treatment with a coagulant with ultrasound. The process takes place in a flowing mode and a time of about 30 minutes. The solution after the first stage of precipitation of titanium compounds Ti is sent to the second stage—the precipitation of zirconium, scandium and rare earth elements in station 12. The precipitate of titanium compounds is sent for processing into marketable products (pigments, powders, alloy, etc.).

In step 12, at the second stage, the precipitation of zirconium, scandium and rare earth elements, the solution is heated to a temperature of about +100 C, kept for about 30 minutes and then liquid reagents NaOH with a concentration of 4 M to pH14 and coagulant based on aluminum in an amount relative to zirconium in a ratio of about 10:1 are added to the solution. The second stage is carried out at a temperature of about +100 C, with treatment of a coagulant and ultrasound. The process runs in a flowing mode and a time of about 30 minutes. The clarified solution after the second stage of precipitation is sent to recovery (regeneration) at station 17, and then to the leaching of aluminum at stage 2. The precipitate of zirconium, scandium and rare earth elements is sent for processing into marketable products (high-purity oxides, metals, powders, ligatures, etc.)

In step 13, cake (sediment) after filtration of the pulp of the first stage of leaching of zirconium, scandium and rare earth elements is sent to the second stage of leaching, where the leaching process is carried out with the same technological parameters as in the first stage at station 8.

In step 14, in the lamellar settler (precipitator), a similar process takes place as in step 11.

In step 15, after the second stage of leaching of zirconium, scandium and rare earth elements, the pulp is sent for filtration in a centrifuge or screw filter press in a flow-through mode. The filtrate is sent to a two-stage sedimentation in lamellar settling tanks, and the cake (sediment), enriched with iron, to the stage of processing into marketable iron-containing products 18 (pigments, coagulants, catalysts, pellets, sorbents, etc.).

In step 16, in the lamellar settler (precipitator), a similar process proceeds as in stage 12.

In step 17, a container for the preparation and recovery (regeneration) of the sodium hydroxide reagent NaOH with a concentration of 4M is heated with steam. Water for solution preparation is activated by cold plasma, which significantly increases reactivity and shortens the time of chemical reactions. The unit includes a NaOH reagent dispenser to strengthen the solution. The temperature in the tank is maintained at about +85 C.

In step 18, iron-containing residue (Fe content up to about 60%) is neutralized to a pH of about 7-9, and provides a valuable product for further processing.

In step 19, a container for the preparation of aluminum-containing coagulant is provided with a mechanical stirrer. Water for solution preparation is activated by cold plasma, which significantly increases reactivity and shortens the time of chemical reactions. The unit includes a reagent dispenser.

In step 20, a gasholder is designed to store the process gas CO2 and to supply it to the technological process. Gas is pre-enriched, dried and cleaned of impurities. The gas supply pressure to the process does not exceed 5 bar. The CO2 content in the process gas might be at least about 20%. CO2 gas is supplied from the exhaust systems of operating plant or from CO2's underground storage facility, which gives a positive environmental effect in the framework of the global program of combating greenhouse gases.

Figure 2:
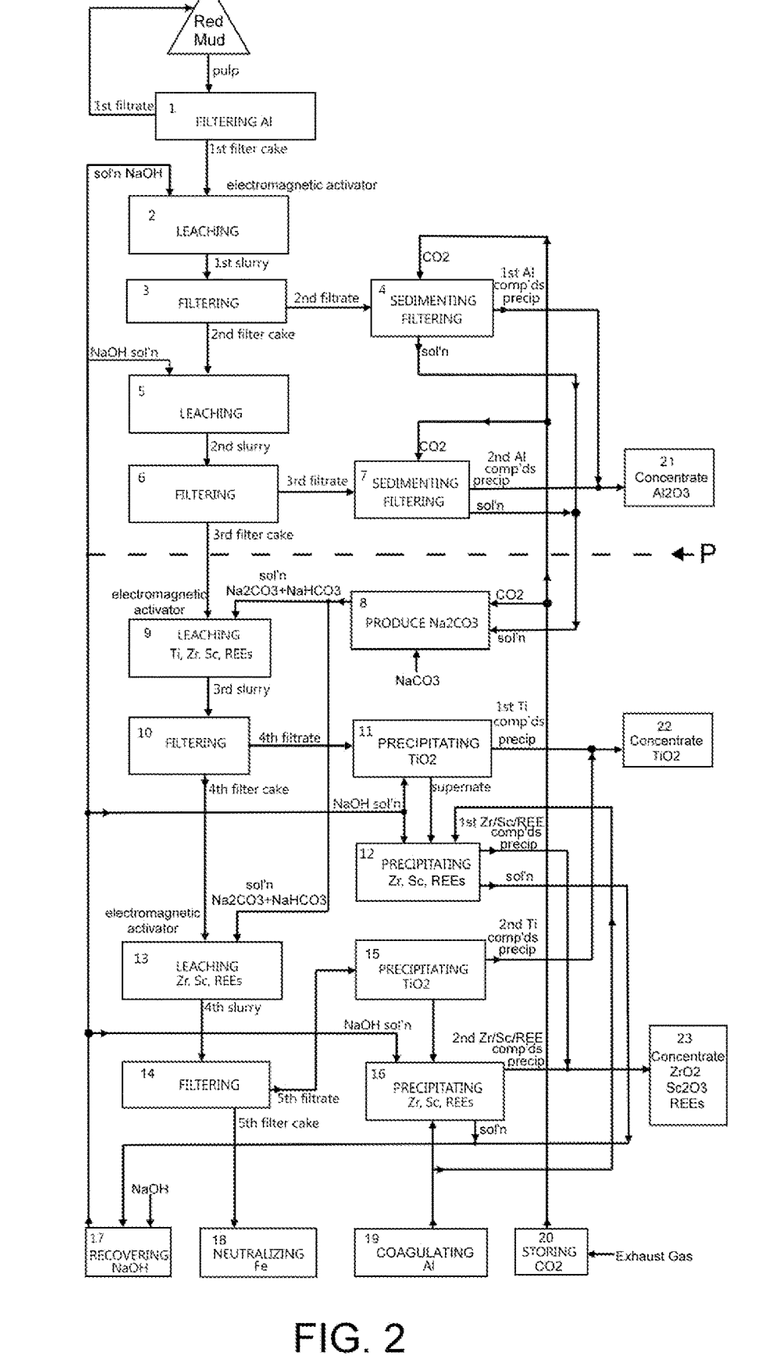
FIG. 2 is another flowchart of the method for processing the pulp.
Figure 2A:
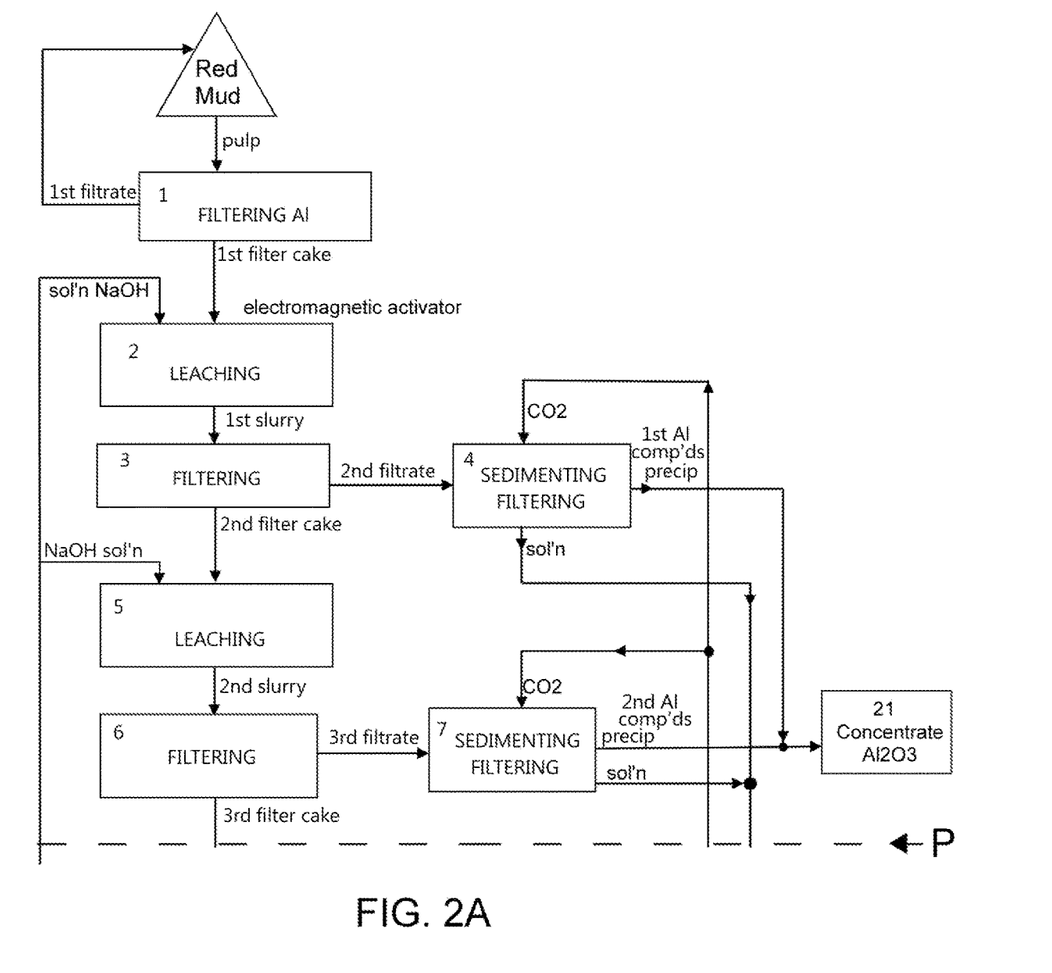
FIG. 2A is a reproduction of a top half (above dashed parting line P) of FIG. 2.
Figure 2B:
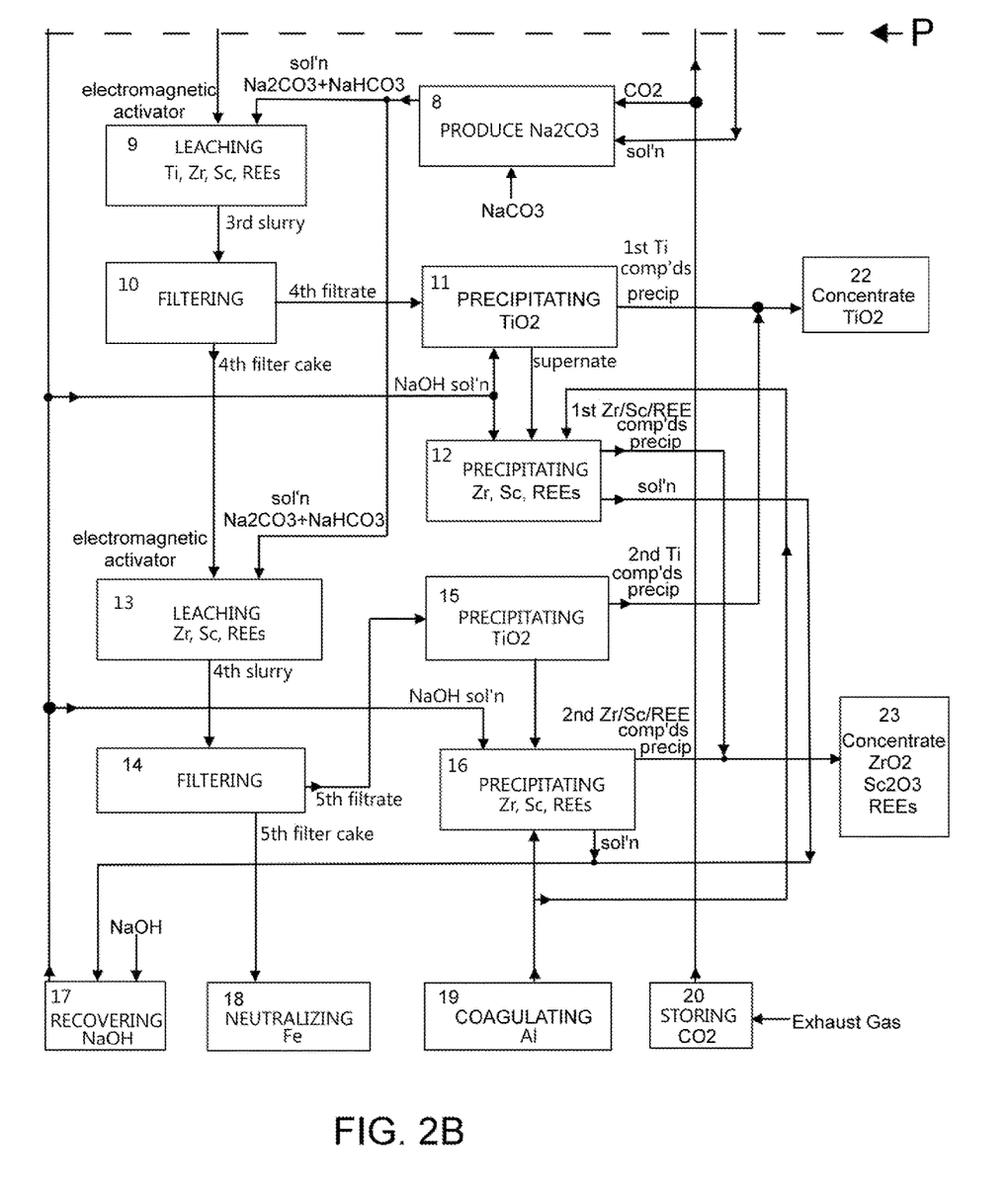
FIG. 2B is a reproduction of a bottom half (below dashed parting line P) of FIG. 2.

The example method described above, for processing pulp, references FIG. 1. This example method can be described in alternative wording as follows, with reference to FIG. 2. FIG. 2A is a reproduction of a top half of FIG. 2, and FIG. 2B is a reproduction of a bottom half of FIG. 2. FIGS. 2A and 2B are configured to be linked together, edge to edge, by overlapping dashed parting line P in FIG. 2A with dashed parting line P in FIG. 2B.

The method includes extracting pulp from the red mud obtained in processing bauxite by a dredger. The pulp is averaged in a container with a mechanical stirrer.

Step 1 includes filtering the pulp in a filter press or a centrifuge to obtain a first filter cake and a first filtrate, and returning the first filtrate to the red mud.

Step 2 includes leaching aluminum from the first filter cake by adding, to the first filter cake, sodium hydroxide (NaOH) solution to form an aluminum-containing first slurry.

Step 3 includes filtering the first slurry, in a centrifuge or a screw filter press in a flow-through mode, to obtain an aluminum-containing second filter cake and a second filtrate. The second filtrate is sent to sedimentation in a lamellar clarifier.

Step 4 includes precipitating, from the second filtrate in the presence of carbon dioxide (CO2) gas, first aluminum compounds that include sodium hydroaluminocarbonate and aluminum hydroxide. The CO2 is supplied from exhaust of an operating plant that performs this method of processing pulp.

Step 5 includes leaching aluminum from the second filter cake, by adding, to the second filter cake, NaOH solution, to form a second slurry.

Step 6 includes filtering the second slurry to obtain a third filter cake and an aluminum-containing third filtrate.

Step 7 includes precipitating, from the third filtrate, second aluminum compounds comprising sodium hydroaluminocarbonate and aluminum hydroxide.

Step 8 includes combining (mixing) a solution of sodium carbonate (Na2CO3) and carbon dioxide (CO2) to obtain a solution of Na2CO3 and sodium bicarbonate (NaHCO3). The CO2 is supplied from exhaust of an operating plant that performs this method of processing pulp.

Step 9 includes leaching compounds of titanium (Ti), zirconium (Zr) and scandium (Sc) from the third filter cake by adding the solution of Na2CO3 and NaHCO3 to the third filter cake to form a third slurry. The solution of Na2CO3 and NaHCO3 has a concentration of about 2M with a temperature of about 70 C in a liquid-solid ratio of about 5:1 in a flow-through mode for leaching Ti, Zr, and Sc and other rare earth elements (REE).

Step 10 includes filtering the third slurry, in a centrifuge or a screw filter press in a flow-through mode, to obtain both a fourth filter cake and a fourth filtrate that includes Ti, Zr and Sc and other rare earth elements (REEs).

Step 11 includes precipitating out first Ti-containing compounds (e.g., TiO2, i.e., titanium oxide) from a mixture of the fourth filtrate and NaOH solution, leaving behind a first supernate solution that includes Zr and Sc and other rare earth elements, wherein the precipitation is carried out at a temperature of about 75 C with addition of a coagulant and ultrasound.

Step 12 includes heating a mixture that includes the first supernate solution and NaOH and an aluminum-based coagulant to about 100 C. This yields a precipitate of first Zr/Sc/REE-containing compounds, which include Zr and Sc and other rare earth elements, such as ZrO2 and Sc2O3. The NaOH has a concentration of about 4M and a pH of 14. A ratio of the coagulant to Zr is about 10:1. The coagulant includes water that is activated by cold plasma.

Step 13 includes leaching Zr and Sc and other rare earth elements from the fourth filter cake, by adding the solution of Na2CO3 and NaHCO3 to the fourth filter cake to form a fourth slurry.

Step 14 includes filtering the fourth slurry, by a centrifuge or a screw filter press in a flow-through mode, to obtain an iron-containing fifth filter cake and a fifth filtrate.

Step 15 includes precipitating out second Ti-containing compounds (e.g., TiO2) from a mixture of the fifth filtrate and a NaOH solution, at a temperature of about 75 C, with addition of a coagulant and ultrasound. This leaves behind a second supernate solution that includes Zr and Sc and other rare earth elements.

Step 16 includes heating, to about 100 C, a mixture that includes the second supernate solution and NaOH and an aluminum-based coagulant. This yields a precipitate of second Zr/Sc/REE-containing compounds, which include Zr and Sc and other rare earth elements (REEs). Such compounds might include ZrO2 and Sc2O3. The NaOH might have a concentration of about 4M and a pH of 14, and a ratio of the coagulant to Zr might be about 10:1, and the coagulant might include water that is activated by cold plasma, and water for solution preparation of the coagulant might be activated by cold plasma.

Step 17 includes obtaining the solution of NaOH used in (i), (xii) and (xvi) by recovering NaOH solution from (xii) and (xvi), and heating the recovered NaOH, and including water that is activated by cold plasma.

Step 18 includes neutralizing the iron-containing fifth filter cake from (xv) to a pH of 7-9.

In step 19, a container for the preparation of aluminum-containing coagulant is provided with a mechanical stirrer. Water for solution preparation is activated by cold plasma, which significantly increases reactivity and shortens the time of chemical reactions. The unit includes a reagent dispenser.

In step 20, a gasholder might store the process gas CO2 and supply it to the technological process. Gas might be pre-enriched, dried and cleaned of impurities. The gas supply pressure to the process might not exceed 5 bar. The CO2 content in the process gas might be at least about 20%. CO2 gas is supplied from the exhaust systems of operating plant or from CO2's underground storage facility, which gives a positive environmental effect in the framework of the global program of combating greenhouse gases.

In step 21, first and second aluminum-containing compounds, which were precipitated respectively in steps 4 and 7, are combined to yield concentrated Al2CO3 compounds.

In step 22, first and second Ti-containing compounds, which were precipitated respectively in steps 11 and 15, are combined to yield concentrated TiO2.

In step 23, the first and second Zr/Cs/REE-containing compounds, which were precipitated respectively in steps 12 and 16, are combined to yield concentrated ZrO2, Sc2O3, and compounds of other rare earth elements.

Other aspects of the example method described above might be characterized as follows:

The present invention is directed to the initial stages of the technological scheme for the complex processing of red mud with the optimization of the processes of alkaline extraction of aluminum and carbonate leaching of zirconium, scandium, rare earth elements to obtain liquid products of aluminum, zirconium, scandium, rare earth elements and cakes enriched in iron for further processing.

The invention relates to the metallurgy of ferrous and non-ferrous metals, namely, to the production of concentrates of iron oxide, aluminum oxide, titanium oxide, scandium, zirconium oxides, REE's oxides and aluminum silicate residue from red mud of alumina production. The method includes preliminary cold plasma, electromagnetic and mechanical activation of red mud.

The method includes two stages of soda-alkali processing: leaching of aluminum and leaching of titanium, scandium and zirconium. The first stage of two-stage aluminum leaching is performed in a solution of sodium hydroxide NaOH with a concentration of 4M at a temperature of about +100 C and atmospheric pressure for about 30 minutes. The second stage of aluminum leaching is performed after filtration of the first stage sediment in a new NaOH solution with the same technological parameters. After the second stage of aluminum leaching, the solution is filtered, as a result of which the filtrate is fed to the aluminum precipitation stage, and the precipitate to the titanium, scandium and zirconium leaching stage.

Precipitation of aluminum compounds is performed when the filtrate is saturated with CO2 gas (exhaust gases with CO2 from various production processes) at a temperature of about +70 C and atmospheric pressure. The second two-stage leaching stage of titanium, scandium and zirconium is carried out in a solution of sodium carbonate Na2CO3 and sodium bicarbonate NaHCO3 with a concentration of about 2M at a temperature of about +70 C, atmospheric pressure, pre-saturated with CO2 gas.

In the process of mixing the mud with the reagent solution, cold plasma, electromagnetic and mechanical activation is performed for about 2-5 seconds in the flow mode. The second stage of titanium, scandium and zirconium leaching is performed after filtration of the first stage sediment in a new solution of Na2CO3 and NaHCO3 with the same technological parameters. After the second stage of leaching of titanium, scandium and zirconium, the solution is filtered. As a result of the later filtration, the filtrate is fed to the stage of precipitation of titanium, scandium and zirconium oxides, and the precipitate enriched with iron Fe is fed to recovery melting or to the production of iron-containing pigments, catalysts and coagulants.

Precipitation of titanium, scandium, and zirconium oxide is performed in two stages with pre-mechanical and electromagnetic activation of the filtrate and treatment with a coagulant. At the first stage, titanium oxide is precipitated at a temperature of about +75 C, atmospheric pressure, for about 30 minutes. At the second stage, scandium and zirconium are precipitated at a temperature of about +100 C, atmospheric pressure, with the addition of a solution of sodium hydroxide NaOH with a concentration of about 5M and a coagulant based on aluminum Al in the ratio to zirconium Zr in the amount of 10Al:1Zr for about 60 minutes. After the second stage of precipitation, the filtrate is strengthened and sent to the beginning of the aluminum leaching process, and precipitation in the form of rough titanium concentrate after the first stage of precipitation and rough scandium and zirconium concentrate after the second stage of precipitation is sent for further enrichment using known technologies.

The technical result is a complex processing of red mud based on soda-alkali technology with simultaneous utilization of greenhouse gas CO2, the use of innovative cold plasma, electromagnetic technology for activating physical and chemical processes in a flow-through mode with a significant increase in the efficiency of the technological process, the extraction of valuable components of red mud to obtain marketable iron concentrates Fe (Fe content up to 60%), titanium Ti, scandium Sc, zirconium Zr, REE's and aluminosilicate residue.

The present invention is directed to the chemistry of carbonate leaching of scandium from red mud. The leaching of zirconium, scandium, and rare earth elements into carbonate solutions is accompanied by hydrolytic polymerization of anionic carbonate complexes in the presence of a carbonic acid proton with their transfer into secondary precipitates, mainly polymeric oxycarbonates.

Using these steps, hydrolytic polymerization of carbonate complexes might be a main reason for the low extraction of zirconium and scandium in carbonate solutions.

Electric pulse action (EPA) and cold plasma action on water and pulp during carbonate leaching of zirconium, scandium and rare earth elements from red mud might significantly accelerate their extraction into solution.

Physicochemical principles have been developed for extracting up to 50% of zirconium and 60% of scandium, and up to 50% of rare earth elements from red mud during carbonate leaching.

Physicochemical foundations have been developed for extracting aluminum from red mud by leaching with aqueous NaOH solutions at atmospheric pressure and temperatures close to the boiling point of alkaline solutions, which made it possible to extract up to 40% aluminum from red mud.

Physicochemical bases of aluminum extraction from alkaline leaching solutions by hydrolytic polymerization in three-phase systems liquid-solid-CO2 gas have been developed.

Conditions have been developed for chemical enrichment of red mud for iron by a factor of 1.2-1.6 at the stages of extracting aluminum, zirconium, titanium, scandium and rare earth elements from them, with the production of iron-containing cakes suitable for reducing iron smelting or for obtaining iron-containing pigments, coagulants catalysts and sorbents.

The method and optimization of the stages of the technological scheme for the integrated processing of red mud with the production of aluminum polyoxycarbonates, rough concentrates of titanium, zirconium, scandium and rare earth elements have been developed and processed for the subsequent production of marketable products and iron-fortified cakes suitable for the recover treatment of iron or for the production of pigments, coagulants, catalysts and sorbents.

A method has been developed for intensive carbonate leaching of aluminum, zirconium and scandium from red mud using activation methods—cold plasma, electric pulse action, mechanical action on the vortex layer apparatus and rod cavitation, which makes it possible to extract up to about 50% of zirconium and rare earth elements and up to about 60% of scandium in one cycle leaching.

A method has been developed for the alkaline extraction of up to about 40% of aluminum from red mud and its subsequent isolation from alkaline solutions in three-phase systems liquid-solid-CO2 gas, with simultaneous enrichment of red mud in iron by about 1.2 to about 1.6 times, which makes it possible to obtain polyoxycarbonates of aluminum and cakes, suitable for recovery iron for smelting and for the production of iron-containing pigments, catalysts and sorbent.

While the above descriptions contain many specificities, these should not be construed as limitations on the scope, but rather as an exemplification of several embodiments thereof. The invention is capable of considerable modification, alteration, and equivalents. Accordingly, the scope should be determined not by the embodiments illustrated, but by the appended claims and their legal equivalents.

Although the invention has been shown and described with respect to a certain preferred embodiment or embodiments, certain equivalent alterations and modifications will occur to others skilled in the art upon the reading and understanding of this specification and the annexed drawings. In particular regard to the various functions performed by the above described components (assemblies, devices, etc.) the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application.

The invention claimed is:

1. A method of processing pulp, wherein the pulp comprises a mixture of ground ore and water that is extracted from the red mud obtained in processing bauxite, the method comprising:
   (i) filtering the pulp to obtain a first filter cake and a first filtrate;
   (ii) leaching aluminum from the first filter cake by adding, to the first filter cake, sodium hydroxide (NaOH) solution to form an aluminum-containing first slurry;
   (iii) filtering the first slurry to obtain an aluminum-containing second filter cake and a second filtrate;
   (iv) precipitating, from the second filtrate in the presence of carbon dioxide (CO2) gas, first aluminum compounds that include sodium hydroaluminocarbonate and aluminum hydroxide;
   (v) leaching aluminum from the second filter cake, by adding, to the second filter cake, NaOH solution, to form a second slurry;
   (vi) filtering the second slurry to obtain a third filter cake and an aluminum-containing third filtrate;
   (vii) precipitating, from the third filtrate, second aluminum compounds comprising sodium hydroaluminocarbonate and aluminum hydroxide;

(viii) combining a solution of sodium carbonate (Na2CO3) and carbon dioxide (CO2) to obtain a solution of Na2CO3 and sodium bicarbonate (NaHCO3);

(ix) leaching titanium (Ti), zirconium (Zr) and scandium (Sc) from the third filter cake by adding the solution of Na2CO3 and NaHCO3 to the third filter cake to form a third slurry;

(x) filtering the third slurry to obtain both a fourth filter cake and a fourth filtrate that includes Ti, Zr and Sc;

(xi) precipitating out titanium oxide (TiO2) from a mixture of the fourth filtrate and NaOH solution, leaving behind a first supernate solution that includes Zr and Sc;

(xii) heating a mixture that includes the first supernate solution and NaOH and an aluminum-based coagulant, to yield a precipitate that includes Zr and Sc;

(xiii) leaching Zr and Sc from the fourth filter cake, by adding the solution of Na2CO3 and NaHCO3 to the fourth filter cake to form a fourth slurry;

(xiv) filtering the fourth slurry to obtain an iron-containing fifth filter cake and a fifth filtrate;

(xv) precipitating out TiO2 from a mixture of the fifth filtrate and a NaOH solution, leaving behind a second supernate solution that includes Zr and Sc; and (xvi) heating a mixture that includes the second supernate solution and NaOH and an aluminum-based coagulant, to yield a precipitate that includes Zr and Sc.

2. The method of claim 1, further comprising a step (xvii), of obtaining the solution of NaOH used in (i), (xii) and (xvi) by recovering NaOH solution from (xii) and (xvi), and heating the recovered NaOH.

3. The method of claim 1, wherein water for solution preparation of the coagulant used in (xii) and (xvi) is activated by cold plasma.

4. The method of claim 1, further comprising, prior to (i), steps of
extracting the pulp from the red mud by a dredger, and averaging the pulp in a container with a mechanical stirrer.

5. The method of claim 1, further comprising, after 1), returning the first filtrate to the red mud.

6. The method of claim 1, wherein the first slurry that is filtered in (iii) is sent for filtration in a centrifuge or a screw filter press in a flow-through mode.

7. The method of claim 1, wherein the second filtrate obtained in (iii) is sent to sedimentation in a lamellar clarifier.

8. The method of claim 1, wherein, in (ix), the solution of Na2CO3 and NaHCO3 has a concentration of about 2M with a temperature of about 70° C. in a liquid-solid ratio of about 5:1 in a flow-through mode for leaching Ti, Zr, and Sc.

9. The method of claim 1, wherein the precipitates yielded by (xii) and (xvi) include other rare earth elements in addition to Sc.

10. The method of claim 1, wherein, in (x), the third slurry is sent for filtration in a centrifuge or a screw filter press in a flow-through mode.

11. The method of claim 1, wherein, in (xi), the precipitation is carried out at a temperature of about 75° C., and includes addition of a coagulant with ultrasound.

12. The method of claim 1, wherein in (xii), the mixture is heated to about 100° C., the NaOH has a concentration of about 4M and a pH of 14, and a ratio of the coagulant to Zr is about 10:1.

13. The method of claim 1, wherein, in (xiv), the filtering is performed by a centrifuge or a screw filter press in a flow-through mode.

14. The method of claim 1, wherein, in (xv), the precipitation is carried out at a temperature of about 75° C., and includes addition of a coagulant with ultrasound.

15. The method of claim 1, wherein in (xvi), the mixture is heated to about 100° C., the NaOH has a concentration of about 4M and a pH of 14, and a ratio of the coagulant to Zr is about 10:1.

16. The method of claim 1, further comprising a step (xviii) that includes neutralizing the iron-containing fifth filter cake from (xv) to a pH of about 7-9.

17. The method of claim 16, wherein, in (xii) and (xvi), the coagulant includes water that is activated by cold plasma.

18. The method of claim 1, wherein the CO2 used in (iv) and (viii) is supplied from exhaust of an operating plant that performs said method of processing pulp.

* * * * *